United States Patent [19]

Realmuto

[11] Patent Number: 5,353,152
[45] Date of Patent: Oct. 4, 1994

[54] SCREEN PROJECTION APPARATUS

[75] Inventor: Charles Realmuto, Coram, N.Y.

[73] Assignee: Vutec Corporation, Bohemia, N.Y.

[21] Appl. No.: 124,861

[22] Filed: Sep. 20, 1993

[51] Int. Cl.⁵ .................. G03B 21/56; A47H 1/00; E06B 9/08
[52] U.S. Cl. .................. 359/461; 160/120; 160/310; 359/443; 359/449
[58] Field of Search .......... 359/443, 449, 461; 160/19, 23.1, 26, 41, 120, 133, 238, 241, 310, 311

[56] References Cited

U.S. PATENT DOCUMENTS

| | | | |
|---|---|---|---|
| 4,045,123 | 8/1977 | Brown | 350/117 |
| 4,089,361 | 5/1978 | Zeppmeisel | 160/120 |
| 4,159,162 | 6/1979 | Christoffel | 350/117 |
| 4,369,829 | 1/1983 | Casiday | 160/120 |
| 4,679,406 | 7/1987 | Weiblen | 62/262 |
| 4,951,730 | 8/1990 | Hsu | 160/310 |
| 5,140,461 | 8/1992 | Blood et al. | 359/461 |

Primary Examiner—Richard A. Wintercorn
Attorney, Agent, or Firm—Edward H. Loveman

[57] ABSTRACT

A screen projection apparatus includes a housing within which a pair of projection screens are stored in a rolled position on motor driven rollers. A pair of access doors are mounted on the housing and support an idler roller over which a screen passes. The access doors open, one at a time, and the idler roller ensures that each of the screens when unrolled hangs in a common plane thereby eliminating the need to refocus the optical projection equipment which is used with the apparatus.

10 Claims, 5 Drawing Sheets

SCREEN PROJECTION APPARATUS

BACKGROUND OF THE INVENTION

1. Field of Invention

This invention relates generally to the field of projection apparatus and more particularly to a screen projection apparatus capable of unrolling one of a plurality of screens for projection, and more specifically to a screen projection apparatus for unrolling one of a plurality of screens for projection at the same optical plane.

2. Description of the Prior Art

The prior art related to projection screens includes apparatus in which a screen is stored rolled on a motor driven roller within a housing. During operation, the motor is energized and the screen is unrolled. When projection is completed, the screen is rerolled on the roller. The projection screen apparatus of the prior art is adapted for the storage and display of a single size screen. In the event that a second size, or second type of screen is required, extensive rework of the installation is required. Attempts to provide a second screen capability through the utilization of a temporary screen are usually unsatisfactory as a result of the difficultly in locating the second screen with sufficient accuracy at the same optical plane, therefore resulting in a need to refocus the projection apparatus and often to make compromises in the focusing operation with results that are usually only marginally acceptable.

SUMMARY OF THE INVENTION

In accordance with the present invention, there is provided a screen projection apparatus which includes a housing within which a pair of projection screens are stored in a rolled position on a pair of motor driven rollers. The housing includes a pair of pivotally mounted access doors. The lower end of each of the screens includes a rod or tube which has portions projecting beyond the width of the screen. The tubes each engage a pair of hooks which are mounted on each of the access doors, which are pivotally mounted on the housing directly below each of the roiled screens. The engagement of the tube on the hooks enables the rolled screen to hold the access door closed thereby concealing the screens when not in use.

The apparatus according to the present invention utilizes a pair of idler rollers which are rotatably mounted, one on each of the access doors. Each screen passes over an idler roller which serves to determine the plane in which the screens hang when unrolled. The idler rollers are positioned so that each of the screens hang in the same plane thereby eliminating the need to refocus the optical projection equipment that is used to project images onto the screen.

It is therefore a principal object of the present invention to provide a multi-projection screen apparatus capable of storing a plurality of projection screens.

Another object of the present invention is to provide a multi-projection screen apparatus capable of unrolling either of a pair of stored screens with the unrolled screen located in the same optical plane when in the projection position.

A further object of the present invention is to provide a multi-projection screen apparatus which is motor driven and contains interlocks which prevent the unrolling of a second screen when a first screen has been unrolled to a projection position.

Yet another object of the present invention is to provide a multi-projection screen apparatus which is capable storing three projection screens and displaying each of the projection screens one at a time.

Still another object of the present invention is to provide a multi-projection screen apparatus which includes access doors which close automatically when a screen is rerolled into the storage position.

These and other objects and many of the attendant advantages of this invention will be readily appreciated as the same becomes better understood by reference to the following detailed description when considered in connection with the accompanying drawings in which:

DETAILED DESCRIPTION OF THE INVENTION

Figure 1:
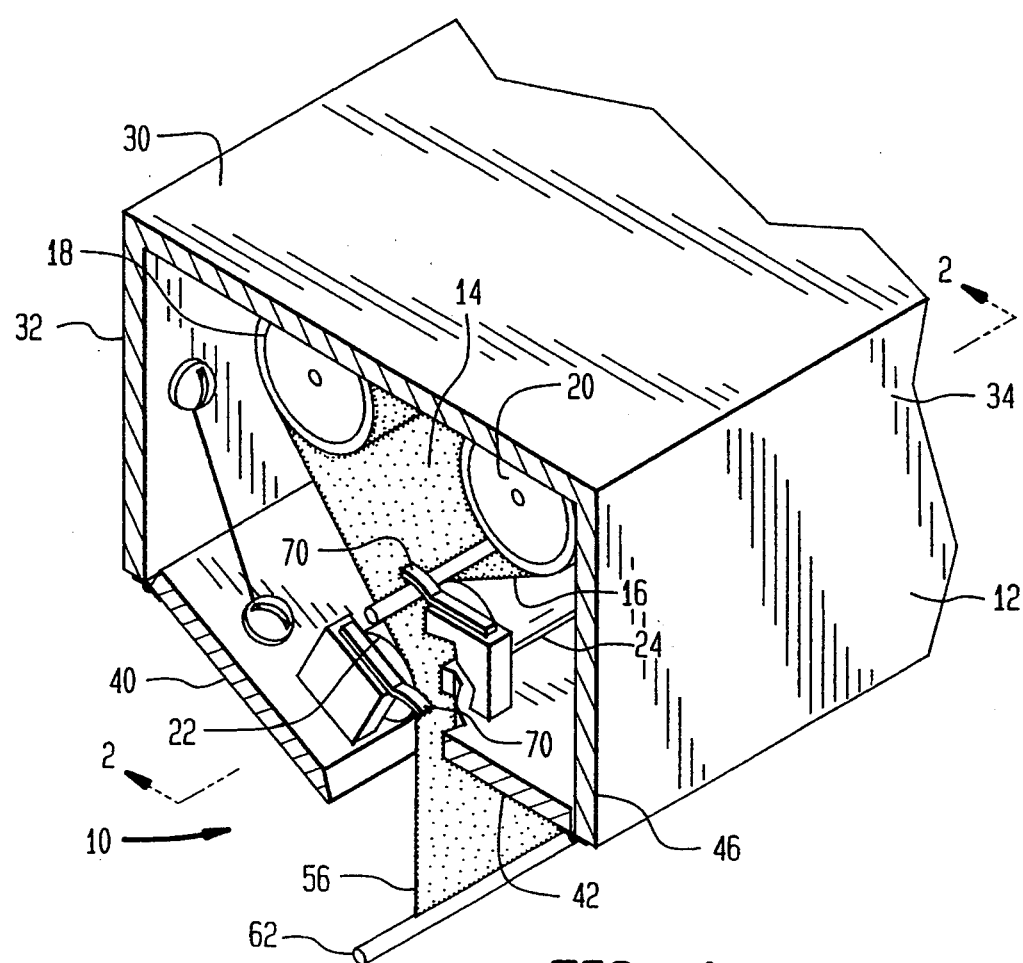
FIG. 1 is a fragmentary perspective view, of a screen projection apparatus according to the present invention with portions of the housing broken away to reveal details of internal construction.
Figure 2:
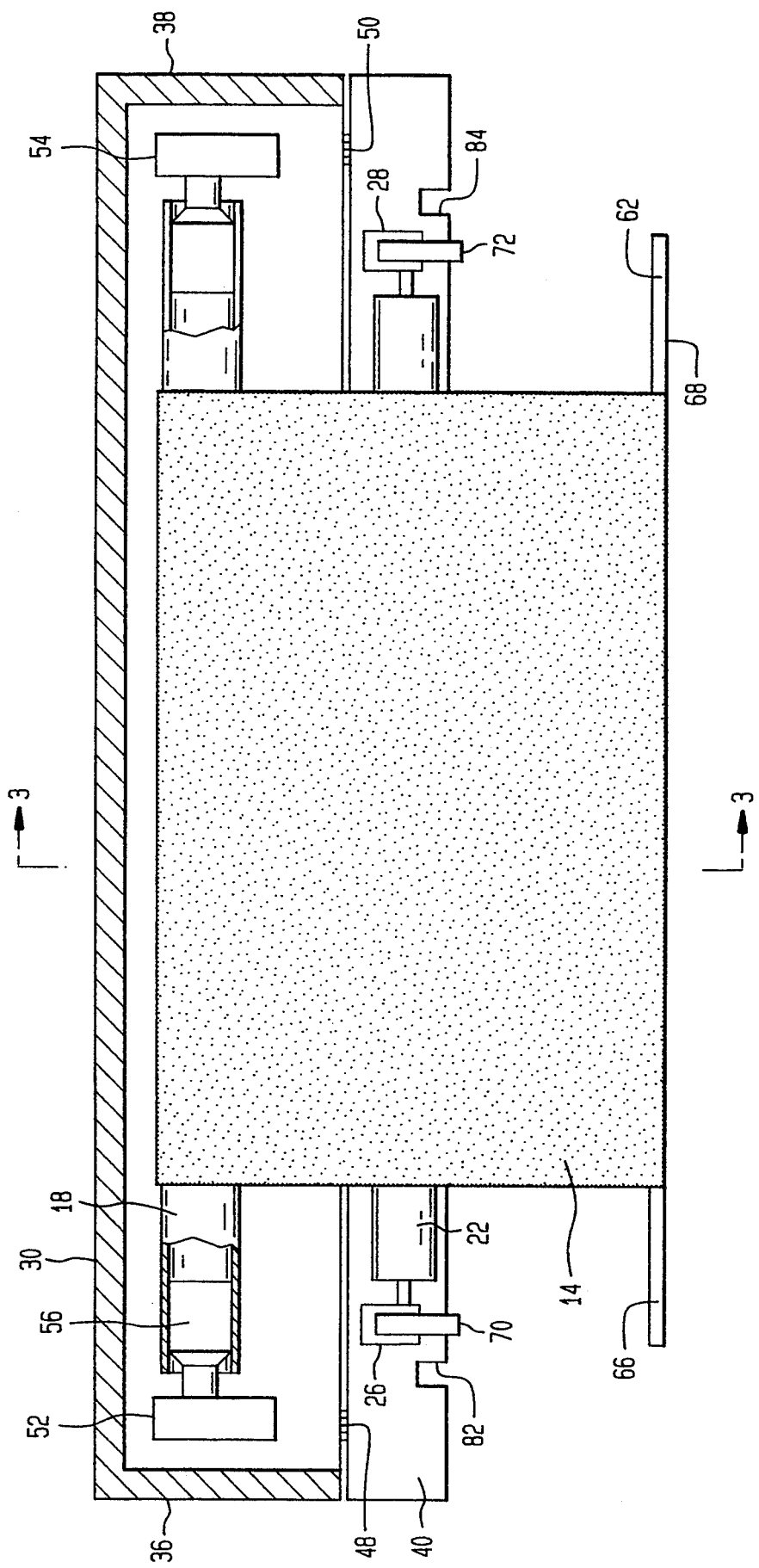
FIG. 2 is a cross-sectional view taken along line 2—2 of FIG. 1.

Referring now to the drawings, wherein like reference characters designate like or corresponding parts throughout, there is shown in FIGS. 1 through 5, a multi-purpose projection screen apparatus, generally designated as reference numeral 10, having a housing 12, a pair of projection screens 14, 16, each of which is rolled onto a respective tubular roller 18,20, a pair of respective idler rollers 22,24, each of which is rotatably mounted on a pair of brackets 26,28 (FIG. 2).

The housing 12 includes a top panel 30, a pair of side panels 32,34, and a pair of end panels 36,38 (FIG. 2). A pair of access doors 40,42 are each pivotally connected to a lower portions 44, 46 of the side panels 32, 34 by hinges 48, 50 illustrated typically in FIG. 2. The housing 12 supports a pair of brackets 52, 54 on which the tubular rollers 18,20 are mounted. Each of the tubular rollers 18,20 has an electric motor 56,57 mounted within the tubular roller as is illustrated, typically, by the motor 56 in FIG. 2. The electric motor 56 is capable of unrolling and rerolling the projection screen 14 in a manner which will be presently described.

Figure 3:
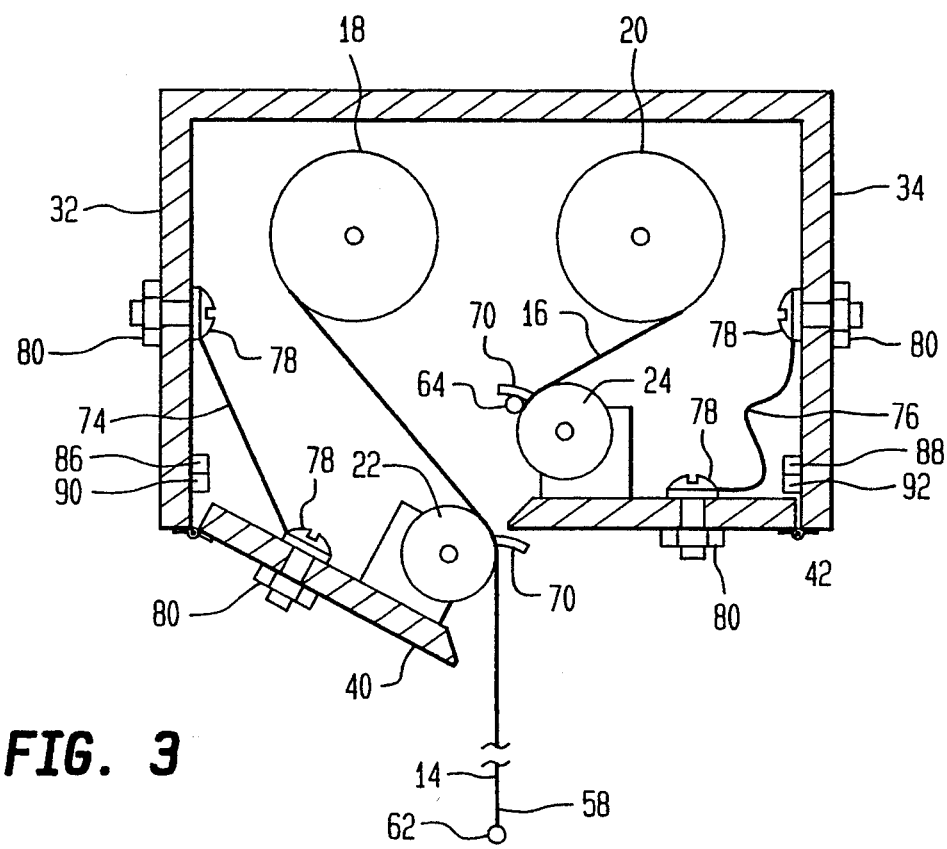
FIG. 3 is a cross-sectional view taken along line 3—3 of FIG. 2 showing the first screen in a lower position.
Figure 4:
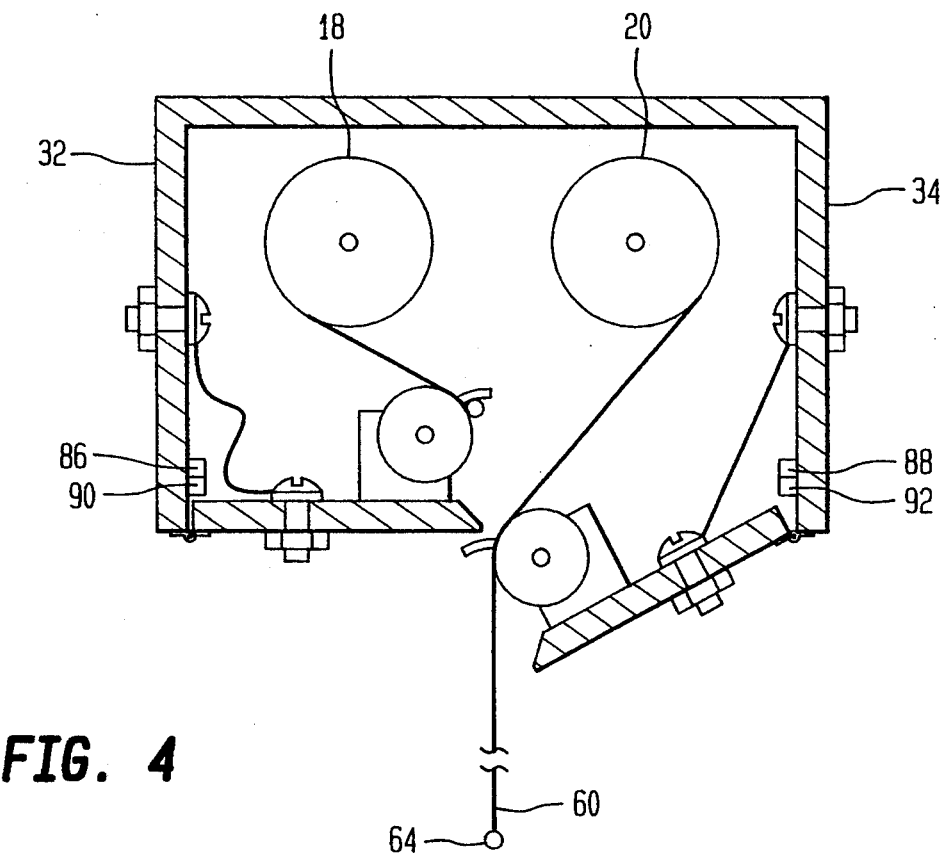
FIG. 4 is a cross-sectional view similar to FIG. 3 showing the second screen in a lowered position.

One of the brackets 26,28 is mounted on each of the access doors 40,42 for rotationally supporting the idler rollers 22,24 over which the projection screens 14,16 pass. As is shown in FIGS. 3 and 4, the idler rollers 22,24 determine the common plane in which the projections screens 14,16 hang. The idler rollers 22,24 are positioned so that the projection screens 14,16, when unrolled, hang in the same plane, thereby eliminating the need to, refocus the optical projection equipment.

A lower end 58,60 of each of the projection screens 14,16 includes a respective tube or rod member 62,64, each of which have end portions 66,68 which project beyond the width of the screens 14,16 as is shown in FIG. 2. The tube members 62,64 serve to maintain the flatness of the projection screens 14,16 and the end portions 66,68 of the tube members 62,64 engage one of a pair of hooks 70,72 which are mounted on the brackets 26,28 or alternatively, are mounted directly on the access doors 40,42.

When the screens 14,16 are rerolled onto the respective rollers 18,20, the engagement of the tube member 62,64 on the respective hooks 70,72 serves to hold the access doors 40,42 closed thereby concealing the projections screens 14,16 when not in use.

The downward swing of the respective access doors 40,42 is limited by a respective cable 74,76 which extends between the access doors 40,42 and the side panels 32,34 of the housing 12, as is shown in FIGS. 3 and 4. When the access door 40 is open the cable 74 is taut and when the access door 42 is pulled closed by the engagement of the tube member 64 on the hooks 72,74 the cable 76 is slack, as is shown in FIGS. 3 and 4. The cables 74,76 are attached to the access doors 40,42 and the side panels 32,34 by bolts 78 and the side panels 32,34 by bolts 78 and nuts 80 thereby enabling the cables 74,76 to be detached from the access doors 40,42 from the outside of the housing 12 and allowing the access doors 40,42 to swing fully open thus facilitating maintenance of the operating portions of the apparatus 10.

The access doors 40,42 may each have a pair of notched portions 82,84 which accommodate the hooks 70,72 mounted on the opposite access door thereby allowing each of the access doors 40, 42 to open and close without interference.

Figure 5:
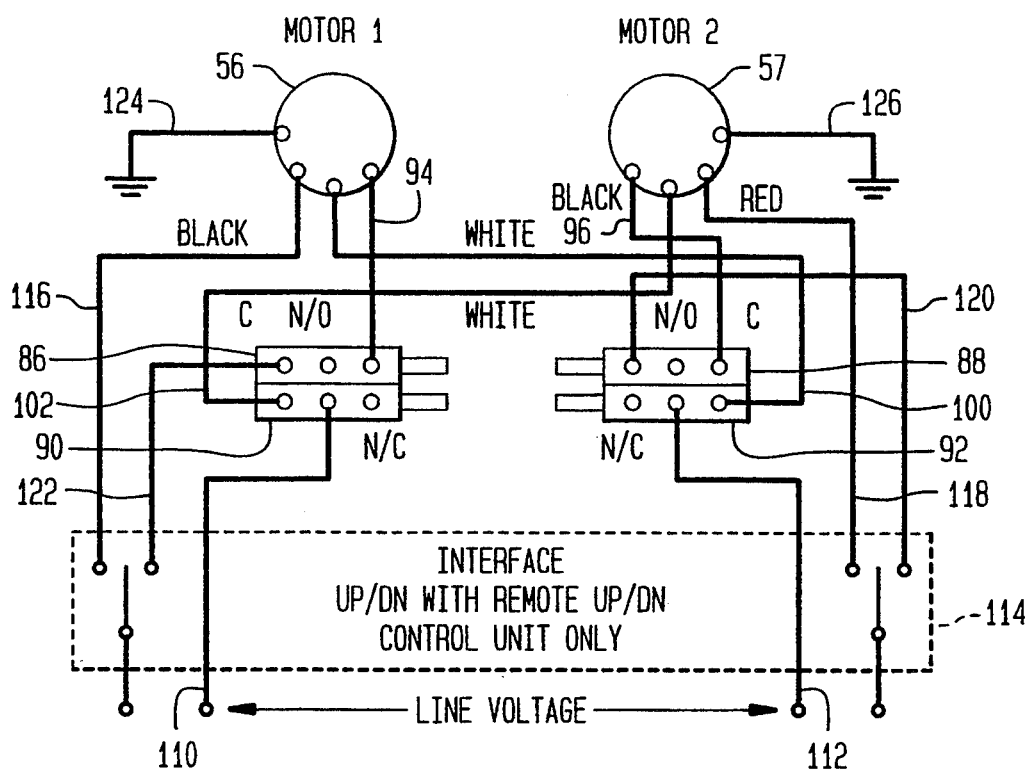
FIG. 5 is a schematic drawing of the electrical control circuit of the apparatus of FIG. 1.

The operation of the apparatus 10 is controlled by a control circuit which includes an interlock capability to ensure that only one access door 40 or 42 can open at any one time. The control circuit is shown in FIG. 5 and includes a pair of normally open switches 86,88 and a pair of normally closed switches 90,92 mounted in the housing 12 to sense the position of the access doors 40,42.

The leads 94,96 connect the normally open switches 86,88 to the motors 56,57 which rotate the rollers 18,20. The motor 56 is connected to the normally closed switch 92 by a lead 100 and the motor 57 is connected to the normally closed switch 90 by a lead 102. The normally closed switches 90,92 are connected to line voltage by the leads 110, 112. The motor 56 is also connected to a remote switch assembly 114 by a lead 116 and the motor 57 is connected to the remote switch assembly 114 by a lead 118. The normally open switch 88 is connected to the remote switch assembly 114 by a lead 120 and the normally open switch 86 is connected to the remote switch assembly 114 by a lead 122. A pair of leads 124,126 connect the respective motors 56,57 to ground.

Figure 6:
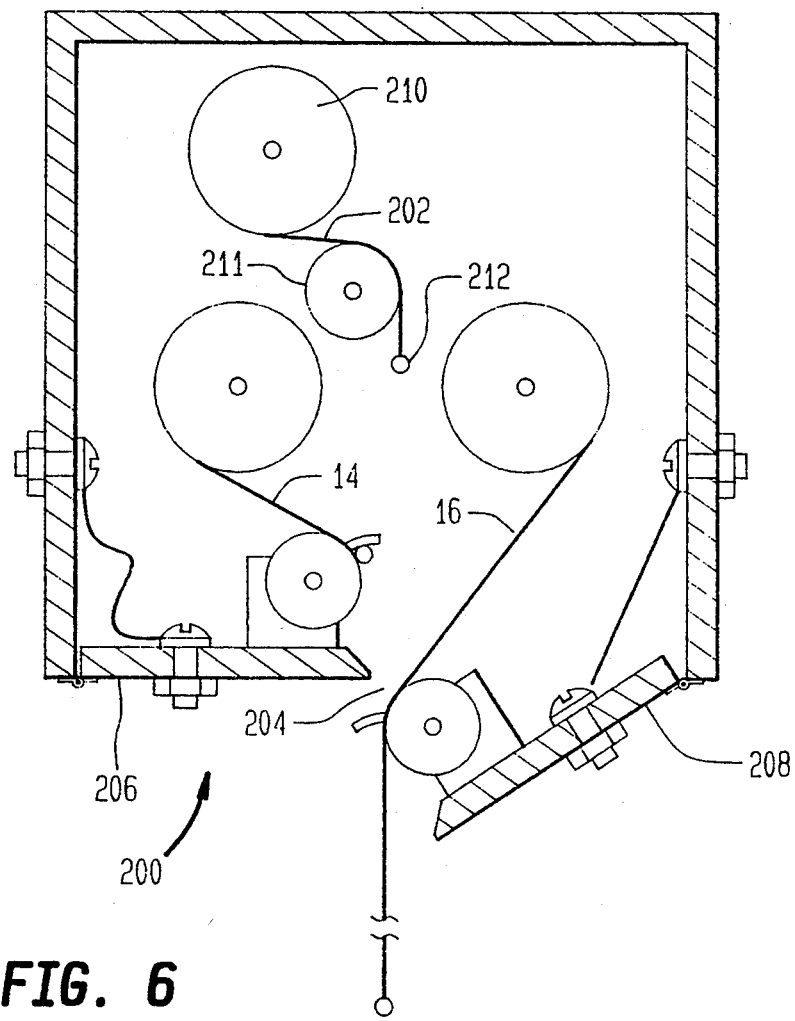
FIG. 6 is a cross-sectional view similar to FIG. 3 showing an alternative embodiment of the invention which includes a third screen.

FIG. 6 shows an alternative embodiment of the invention designated as reference numeral 200 which incorporates a third screen 202. The portions of the apparatus 200 which operate the screens 14,16 are identical to the corresponding portions which have been previously described in connection with FIGS. 1 through 5, with the exception that the proportions of the access door 40, 42 have been modified to provide an opening 204 between the two access doors 206,208 to allow the passage of a third screen 202 and the associated tube 212 when the two access doors 206,208 are in the closed position. An idler roller 211 is mounted below the roller 210 and serves to ensure that the screen 202, when unrolled, hangs in the same optical plane as the screens 14 and 16.

It should be understood that the foregoing relates to a limited number of preferred embodiments of the invention which have been by way of and that it is intended to cover all changes and modifications of the examples of the invention herein chosen for the purpose of the disclosure, which do not constitute departures from the spirit and scope of the invention.

What is claimed:

1. A screen projection apparatus, comprising:
a housing;
a pair of roller means rotatably mounted in said housing and spaced apart;
first and second projection screens with one of said projection screens rolled on one of said roller means;
driving means connected to each of said roller means for unrolling said screens, one at a time, from said roller means and rerolling said projection screens onto said roller means; and
idler roller means mounted on said housing with said projection screens passing over said idler roller means and with said idler roller means establishing a common plane in which each of said projection screens hang when said projection screens are unrolled.

2. A screen projection apparatus as claimed in claim 1 in which said idler roller means comprises a pair of spaced idler rollers, with each of said projection screens passing over one of said idler rollers.

3. A screen projection apparatus, as claimed in claim 1, further comprising a pair of access doors each pivotably mounted on said housing with said access doors capable of opening, one at a time, to permit unrolling of one of said projection screens.

4. A screen projection apparatus, as claimed in claim 3 in which said roller means comprise a pair of idler rollers and two pairs of rotational mounting means supporting said idler roller and with one pair of said rotational mounting means disposed on each of said access doors.

5. A screen projection apparatus as claimed in claim 1, in which said driving means comprises electric motor means.

6. A screen projection apparatus as claimed in claim 3, in which said projection screens and said access doors include engagement means enabling a projection screen, when rerolled, to engage an access door and pull said access door closed.

7. A screen projection apparatus, as claimed in claim 6 in which said engagement means comprises:
hook means mounted on said access doors; and
projecting bar means mounted on said projection screens and capable of engaging said hook means.

8. A screen projection apparatus, as claimed in claim 1 in which said roller means is tubular in configuration.

9. A screen projection apparatus in which said access doors include limit means disposed to limit the downward swing of said access doors.

10. A screen projection apparatus as claimed in claim 1, further comprising:
a third roller means rotatably mounted in said housing;
driving means connected to said third roller means for unrolling and rerolling said third projection screen means onto said third roller means; and
third idler roller means, with said third projection screen passing over said third idler roller means and with said third idler roller means causing said third projection screen to hang in said common plane when unrolled from said third roller means.

* * * * *